(12) United States Patent
Meillat et al.

(10) Patent No.: US 9,169,028 B2
(45) Date of Patent: Oct. 27, 2015

(54) FUEL STORAGE TANK, AN AIRCRAFT, AND A METHOD

(71) Applicant: AIRBUS HELICOPTERS, Marignane, Cedes (FR)

(72) Inventors: Roland Meillat, Saint Cannat (FR); Stephane Mougin, Rousset (FR); Quitterie Brescon, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/083,603

(22) Filed: Nov. 19, 2013

(65) Prior Publication Data

US 2014/0144917 A1    May 29, 2014

(30) Foreign Application Priority Data

Nov. 26, 2012  (FR) ...................................... 12 03186

(51) Int. Cl.
*B64D 37/04* (2006.01)
*B64D 37/08* (2006.01)
*B64D 37/22* (2006.01)

(52) U.S. Cl.
CPC ................ *B64D 37/04* (2013.01); *B64D 37/08* (2013.01); *B64D 37/22* (2013.01); *Y10T 137/0318* (2015.04)

(58) Field of Classification Search
CPC ........ B64D 37/04; B64D 37/08; B64D 37/20; B64D 37/22
USPC .............. 220/501, 4.12, 4.14, 4.15, 562–564; 137/571–577
See application file for complete search history.

(56) References Cited

U.S. PATENT DOCUMENTS

| | | | |
|---|---|---|---|
| 2,654,553 A | 10/1953 | Noon et al. | |
| 2,703,607 A | 3/1955 | Simmonds | |
| 2,860,648 A * | 11/1958 | Harrison | 137/38 |
| 3,409,253 A | 11/1968 | Berg et al. | |
| 4,026,503 A | 5/1977 | Rhodes | |
| 5,016,670 A * | 5/1991 | Sasaki et al. | 137/574 |
| 5,927,651 A | 7/1999 | Geders et al. | |
| 8,002,142 B2 | 8/2011 | Losinski et al. | |
| 2008/0083761 A1* | 4/2008 | Magnusson et al. | 220/562 |
| 2009/0283159 A1* | 11/2009 | Schaefer, Jr. | 137/587 |
| 2010/0045017 A1* | 2/2010 | Rea | 280/830 |
| 2013/0320146 A1* | 12/2013 | Basset | 244/135 C |

FOREIGN PATENT DOCUMENTS

| | | |
|---|---|---|
| EP | 2135805 A2 | 12/2009 |
| EP | 2135805 A3 | 3/2012 |
| FR | 2294913 | 7/1976 |

OTHER PUBLICATIONS

Search Report for FR 1203186, Completed by the French Patent Office on Jul. 15, 2013, 7 Pages.

* cited by examiner

*Primary Examiner* — Anthony Stashick
*Assistant Examiner* — Mollie Llewellyn
(74) *Attorney, Agent, or Firm* — Brooks Kushman P.C.

(57) ABSTRACT

A tank (10) having a casing (20) with a bottom (21) together with a side wall (23) and a top wall 22. The tank (10) has at least one sloping wall (30) for providing at least one slope (30) for directing fuel towards a predetermined zone (100) of the tank (10) by gravity, the sloping wall (30) subdividing the inside volume of the tank into a main volume (V1) and an under-slope volume (V2) both of which are to receive fuel. The tank (10) is provided with a fuel transfer system (40) for transferring fuel from the under-slope volume (V2) to the main volume (V1), and from the main volume (V1) to the under-slope volume (V2).

19 Claims, 2 Drawing Sheets

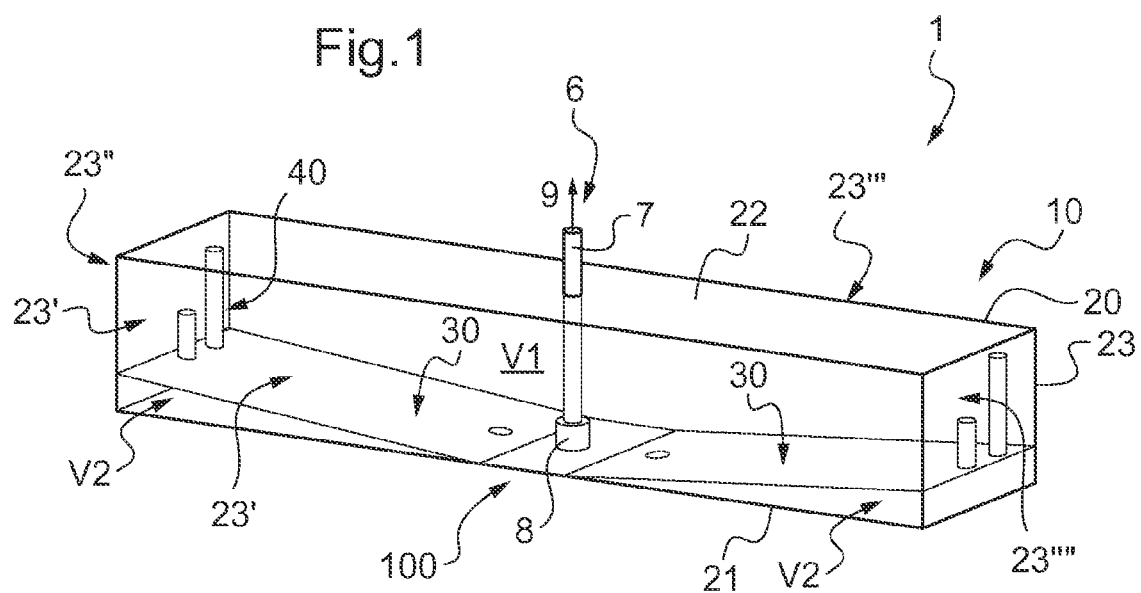
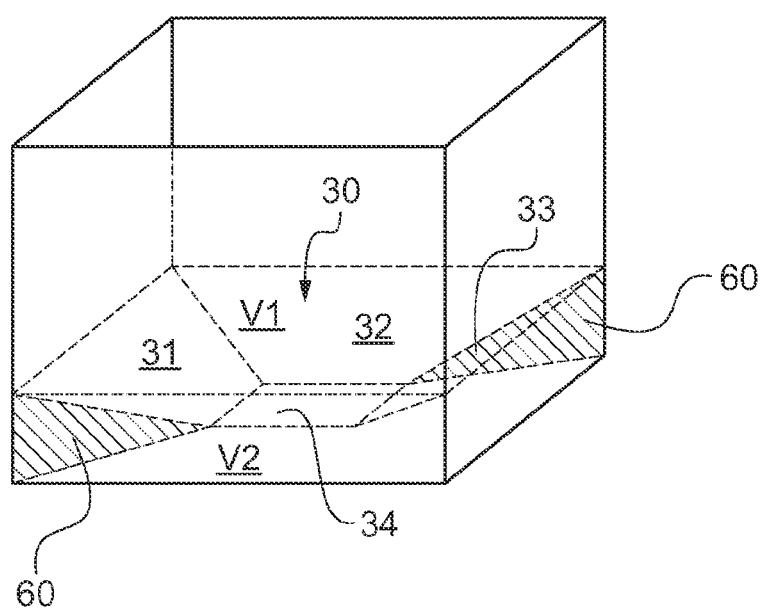

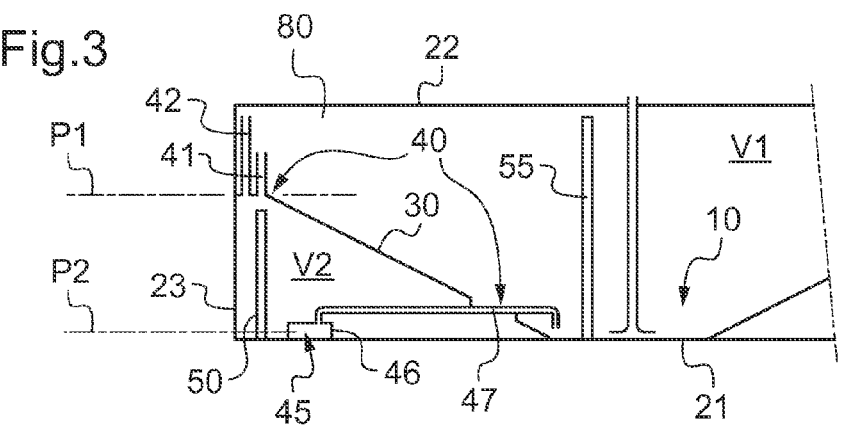

US 9,169,028 B2

FUEL STORAGE TANK, AN AIRCRAFT, AND A METHOD

CROSS REFERENCE TO RELATED APPLICATION

This application claims priority to French patent application No. FR 12 03186 filed on Nov. 26, 2012, the disclosure of which is incorporated in its entirety by reference herein.

BACKGROUND OF THE INVENTION

1. Field of the Invention

The present invention relates to a fuel storage tank, to an aircraft having such a tank, and to a method of controlling such a tank.

The invention thus lies in the technical field of tanks, and more particularly in the field of aircraft fuel tanks 2. Description of Related Art Conventionally, an aircraft has at least one tank for feeding fuel to a power plant. Pipework may be arranged for transferring fuel from the tank to an engine, or indeed to some other tank, for example.

The pipework opens out in the tank in a zone that is referred to for convenience as the "feed zone". The pipework may comprise at least one pipe, and possibly also at least one booster pump.

Depending on the shape of the tank and on the position of the feed zone, a volume of fuel may be incapable of reaching the feed zone. This volume of fuel is sometimes referred to as the "non-consumable volume" insofar as this volume of fuel cannot be consumed by an engine.

In order to minimize the non-consumable volume in tanks, manufacturers include sloping surfaces in the bottoms of tanks in order to direct fuel towards the feed zone. Such surfaces are referred to as "slopes" for simplification. The slopes may be directed in the longitudinal direction and in the transverse direction relative to the vehicle.

In the context of an aircraft, the angle of the slopes may depend on the flight capacity of the aircraft, and more precisely on its capacity for sloping (attitude) and for angular acceleration/deceleration about its pitching and roll axes. Whatever the position of the aircraft, the feed zones must be capable of feeding the engines of the aircraft throughout a flight.

Under such circumstances, tanks may be made out of flexible material. By way of example, such a material may comprise a polyester backing with a mixture of elastomers. Foams inserted inside the compartment for a tank thus make it possible to provide the slopes on which the flexible tank rests.

For example, the slopes may have an angle lying in the range 5° to 9° in the longitudinal direction, and the angle may be about 3° in the transverse direction.

Nevertheless, installing foams and shaping the bottom corners of tanks leads to a non-negligible loss in the volume of fuel that can be carried. Furthermore, performance differences between different aircraft imply that the shape of each tank ought to be designed as a function of each particular aircraft, thereby preventing any type of standardization.

The technological background includes document U.S. Pat. No. 5,927,651.

That document discloses a fuel tank device having a deformable elastomer structure capable of adapting to the shapes of a compartment.

Document FR 2 294 913 discloses expandable fuel storage means capable of being expanded to take up a position in which it is located at least in part outside a zone of an airplane referred to as a "surface zone".

Document U.S. Pat. No. 3,409,253 discloses a retractable tank system for an aircraft formed by rigid means surrounding a flexible surface for adapting to the quantity of fuel carried.

Also known are documents EP 2 135 805, U.S. Pat. No. 2,703,607, and U.S. Pat. No. 2,654,553.

Document EP 2 135 805 describes a container having an opening putting the inside of the container into fluid flow communication with the outside atmosphere. The container also houses a variable volume device.

BRIEF SUMMARY OF THE INVENTION

An object of the present invention is thus to provide a tank seeking to overcome the limitation on the volume of fuel that can be carried as caused by making use of at least one slope.

According to the invention, a tank for storing fuel possesses a casing. The casing extends in elevation from a bottom to a top wall, with a side wall defining the sides of the casing between the bottom and the top wall.

In remarkable manner, the tank is provided with at least one sloping wall inside the casing. Each sloping wall thus extends between the side wall and the bottom so as to provide at least one slope for directing fuel towards a predetermined zone of the tank by gravity. The predetermined zone may be a feed zone of the above-described type.

The tank casing defines an inside volume, and the sloping wall subdivides this inside volume of the tank into a main volume and an under-slope volume, both of which are to contain fuel, the under-slope volume being defined by said sloping wall together with the side wall and said bottom. The tank is provided with a fuel transfer system for transferring fuel from the under-slope volume to the main volume and from the main volume to the under-slope volume.

We understand by "wall . . . " providing at least one slope, a wall including one or more sloping faces. A wall may thus present slopes in a plurality of directions in order to provide a plurality of slopes.

It can be understood that in the presence of a plurality of sloping walls, the inside volume is split into a main volume and one under-slope volume per sloping wall.

Under such circumstances, each sloping wall defines a slope and an under-slope volume that can be used for storing fuel. Conversely, if the slopes are made using foam as in the prior art, then any under-slope volume is not usable for storing fuel.

The transfer system then makes it possible to make use of the fuel present under the slopes.

Thus, during filling, the main volume is filled with fuel, with the transfer system filling each of the under-slope volumes from the main volume.

Thereafter, the transfer system serves to transfer the fuel stored in the under-slope volume into the main volume.

The invention then makes use of a volume that is not used in prior art techniques, e.g. of the kind using foams, while nevertheless retaining the use of slopes. The volume of fuel that can be carried is thus increased significantly for given overall size of the tank compared with a prior art system having a tank and at least one piece of foam.

Furthermore, the under-slope volume presents the advantage of adding damping capabilities to the tank in the event of a crash.

The under-slope volume may possibly also limit fuel leakage under certain crash configurations.

Thus, the transfer system includes at least one feed duct for transferring fuel by gravity from the main volume to the under-slope volume, the transfer system including at least one active means for transferring fuel from the under-slope volume to the main volume.

For example, the transfer system includes one feed duct and one active means per sloping wall.

The transfer system is then relatively simple and effective. Fuel is transferred from the main volume to the under-slope volume by gravity. In contrast, the transfer of fuel from the under-slope volume to the main volume may be driven by active means in order to guarantee that the stored fuel can be used.

The tank may also present one or more of the following additional characteristics.

The feed duct possibly passes through the sloping wall in order to put the main volume into communication with an under-slope volume.

The feed duct may be a simple orifice formed in the sloping wall, or it may be a tube passing through the sloping wall, for example.

In addition, the active means may comprise a pump leading to the main volume.

The pump may include suction means arranged in an under-slope volume, and a duct passing through the sloping wall.

Alternatively, the active means may comprise an ejector, possibly co-operating with ducts for conveying fuel.

In the context of an aircraft tank feeding at least one engine, the active means may possibly deliver a small amount of air into the main volume during changes in the attitude of the aircraft.

Nevertheless, the active means do not feed the engine directly. The air transferred by the active means then rises to the surface of the main volume and does not disturb the feeding of fuel to the engine.

Furthermore, the feed duct in one variant may be vertically above the active means. The feed duct is arranged in a high plane so as to tend to fill the under-slope volume completely, while the active means are arranged in a low plane so as to tend to empty the under-slope volume completely.

In another variant, the feed duct opens out in the suction plane of the active means, or even below this plane.

The transfer system may include at least one vent means for venting the under-slope volume. For example, the tank may include at least one vent means per under-slope volume.

During filling, the air present in the under-slope volume is expelled via the vent means.

The vent means may pass through the sloping wall and open out into a space in the main volume that is connected to the open air.

In addition, the tank may include an under-slope gauge system for gauging the fuel contained in the under-slope volume, and a main gauge system for gauging the fuel contained in the main volume.

The crew can then be made aware of the total stored volume of fuel by displaying the volume of fuel present in the under-slope volumes and the volume of fuel present in the main volume, or indeed by displaying the sum of the volumes of fuel present both in the under-slope volumes and in the main volume.

Furthermore, when the tank has at least two sloping walls, each providing a respective under-slope volume, the tank may include communication means for putting said under-slope volumes into communication with each other.

The tank may also include at least one separation wall for splitting an under-slope volume into two volumes. Under such circumstances, a large under-slope volume may be split into two small under-slope volumes.

In addition to a tank, the invention provides an aircraft including such a tank.

The invention also provides a method of storing fuel in such a tank. The method comprises the following steps:
  filling the main volume with fuel, each under-slope volume being filled with fuel from the main volume by the transfer system; and
  drawing fuel from the main volume in order to consume it, and transferring fuel from the under-slope volume to the main volume via the transfer system.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a diagram showing a tank of the invention;

FIG. 2 is a diagram showing a tank of the invention in three dimensions;

FIG. 3 is a diagram showing a transfer system of a tank of the invention; and

FIGS. 4 to 10 are diagrams explaining the operation of the invention.

Elements that are present in more than one of the figures are given the same references in each of them.

DETAILED DESCRIPTION OF THE INVENTION

FIG. 1 shows a vehicle 1 of the invention. By way of example the vehicle is an aircraft, such as an aircraft having a rotary wing.

The aircraft 1 possesses a storage system. The storage system may in particular be a system for storing fuel for feeding to a power plant 9, or to some other tank, or indeed to some other tank group.

The other members of the aircraft are not shown in order to avoid overcrowding FIG. 1.

The storage system is provided with at least one tank 10 arranged in a compartment of the vehicle 1. The tank 10 has a casing 20 defining an inside storage volume.

The casing 20 thus extends in elevation from a bottom 21 towards a top wall 22, which are spaced apart by a side wall 23. Each wall comprises a plurality of facets. For example, the side wall 23 as shown has four side facets in elevation 23', 23", 23''', and 23''''.

Furthermore, the tank 10 includes pipework 6 for feeding a power plant 9, or indeed another tank. The pipework 6 opens out in a predetermined fuel transfer zone 100, this predetermined zone 100 also being referred to as a "feed zone". The pipework 6 may comprise either at least one pipe 7, or else as shown at least one pipe 7 and a booster pump 8.

The tank also includes at least one slope for directing fuel towards the predetermined fuel-transfer zone 100.

Consequently, the tank 10 is provided with at least one sloping wall 30 fastened both to the side wall 23 and to the bottom 21. Each sloping wall serves to provide at least one slope directed towards the predetermined zone 100.

In addition, each sloping wall 30 serves to provide an under-slope volume V2 that is hollow and suitable for containing fuel.

Under such circumstances, the inside volume of the tank is split into a main volume V1 including the predetermined zone 100, and one under-slope volume V2 per sloping wall. In contrast to the term "under-slope volume", the main volume may also be referred to as the "above-slope volume", for example.

FIG. 1 shows an embodiment having two sloping walls 30, each defining an under-slope volume. In this configuration, the tank may include communication means for putting said under-slope volumes into communication with each other. Such communication means are not shown for convenience, but they may comprise at least one pipe, and possibly also a pump or an ejector.

With reference to FIG. 2, a sloping wall 30 may comprise a plurality of sloping faces 31, 32, 33, 34. Each face serves to create a slope in a particular direction.

Under such circumstances, the tank 10 may be fitted with at least one separation wall 60. The separation walls then split the under-slope volume V2 generated by each face 31, 32, 33, 34 of the sloping wall 30 into a plurality of small under-slope volumes.

With reference to FIG. 3, and independently of the variant, the tank 10 is provided with a transfer system 40. This transfer system 40 serves to transfer fuel from the under-slope volume V2 to the main volume V1, and from the main volume V1 to the under-slope volume V2.

This transfer system 40 includes at least one feed duct 41. Each feed duct 41 serves to transfer fuel under gravity from the main volume V1 to an under-slope volume V2.

Consequently, the transfer system 40 may include for example one feed duct 41 per under-slope volume. A plurality of feed ducts 41 may also be provided in order to maximize the filling rate of the under-slope volume. Each feed duct 41 may thus comprise pipework passing through the sloping wall 30.

When an under-slope volume is split into a plurality of small under-slope volumes, each small under-slope volume is provided with at least one feed duct.

Each feed duct 41 thus allows fluid to be transferred by gravity from the main volume V1 to an under-slope volume V2.

In addition, the transfer system 40 includes at least one active means 45 for transferring fuel from the under-slope volume V2 to the main volume V1. The function of each active means 45 is to transfer fuel in active manner from an under-slope volume V2 to the main volume V1.

Consequently, the transfer system 40 may include for example one active means 45 per under-slope volume.

When an under-slope volume is split into a plurality of small under-slope volumes, each small under-slope volume is provided with respective active means 45.

The active means 45 shown in FIG. 3 comprises a pump 46 having an opening into the under-slope volume V2. The pump 46 includes suction means suitable for sucking in fuel, and a duct 47 that opens out in the mean volume V1.

In a variant, the active means may comprise an ejector 48, as schematically shown in FIG. 9.

In the example of FIG. 3, at least one pump 46 or at least one ejector is arranged in each under-slope volume. Nevertheless, it is possible to arrange the pump or the ejector in the main volume V1.

For example, a pump 46 arranged in the under-slope volume sucks in fuel from at least one under-slope volume V2 via at least one pipe, and then transfers the fuel into the main volume V2.

Furthermore, the feed duct may for example be vertically about the active means, as shown in the embodiment of FIG. 3.

The feed duct opens out in a high plane P1, while the active means take in fuel from an under-slope volume in a low plane P2. The high plane P1 is then vertically above the low plane P2, in particular when the vehicle is on the ground.

In addition, the transfer system 40 may for example include at least one vent means 42 for connecting the under-slope volume V2 to the open air.

The vent means 42 may include venting pipework passing through the sloping wall 30 so as to open out in the open air. For example, the venting pipework opens out into a space 80 in the main volume V1, this space being connected to the open air by conventional means.

Furthermore, the tank 10 optionally includes a device for determining the volume of fuel stored therein. This device includes an under-slope gauge system 50 for gauging the fuel contained in the under-slope volume V2, and a main gauge system 55 for gauging the fuel contained in the main volume V1.

For example, the under-slope gauge system 50 may for example include one gauge means per under-slope volume, such as one fuel gauge or any other known means, for example.

When an under-slope volume is split into a plurality of small under-slope volumes, each small under-slope volume is provided with respective gauge means.

FIGS. 4 to 10 explain a method of storing fuel that makes use of such a tank.

With reference to FIG. 4, an operator fills the tank 10 by pouring fuel into the main volume V1, as represented by arrow F.

The level of fuel then rises in this main volume V1 as represented by arrows F1.

With reference to FIG. 5, each under-slope volume is filled with fuel from the main volume by the transfer system, starting from a threshold level.

More precisely, from a threshold level that is determined by the height of the feed duct 41, the fuel present in the main volume V1 flows along the feed ducts 41 as represented by arrow F2.

Thus, the level of fuel in the under-slope volumes increases.

Furthermore, the air present in the under-slope volume is expelled from the under-slope volumes via the vent means 42, as represented by arrow F3.

Depending on the rate at which the main volume is filled and the rate at which the under-slope volumes are filled, the level of fuel may continue to rise in parallel in the main volume.

At the end of filling, and as shown in FIG. 6, the stored fuel can be transferred out from the tank. For example, the stored fuel is transferred towards a power plant, being taken from the main volume as represented by arrow F4.

With reference to FIG. 7, and in parallel with such fuel consumption, the transfer system transfers fuel from the under-slope volumes to the main volume of the tank as represented by arrows F6.

So long as the feed duct 41 is immersed in fuel, the fuel returns into the under-slope volume from the main volume, as represented by arrow F7.

With reference to FIG. 8, when the feed duct 41 emerges above the level of fuel in the main volume, the level of fuel in the under-slope volumes lowers as represented by arrows F8.

With reference to FIG. 9, when the under-slope volumes are empty, fuel remains present in the main volume. This remaining fuel is directed towards the predetermined zone by the slopes formed by the sloping wall(s).

The transfer system for transferring fluid from the under-slope volumes to the main volume may then be stopped.

With reference to FIG. 10, the fuel may be used up at the end of a flight if the vehicle is an aircraft.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A tank for storing fuel, the tank having a casing extending in elevation from a bottom towards a top wall, a side wall defining the casing between the bottom and the top wall, the casing thus defining an inside volume of the tank, the tank being provided with at least one sloping wall that extends between the side wall and the bottom in order to provide at least one slope directing the fuel towards a predetermined zone of the tank by gravity, the sloping wall subdividing the inside volume of the tank into a main volume (V1) and an under-slope volume (V2) both of which are to contain fuel, the under-slope volume (V2) being defined by the sloping wall together with the side wall and the bottom, wherein the tank is provided with a fuel transfer system for transferring fuel from the under-slope volume (V2) to the main volume (V1) and from the main volume (V1) to the under-slope volume (V2), the transfer system including at least one feed duct for transferring fuel by gravity from the main volume (V1) to the under-slope volume (V2), at least one active means for transferring fuel from the under-slope volume (V2) to the main volume (V1), and at least one vent means for venting the under-slope volume (V2), with the vent means passing through the sloping wall and leading to a space in the main volume (V1).

2. A tank according to claim 1, wherein the feed duct passes through the sloping wall and the predetermined zone is disposed within the main volume (V1) and comprises a feed zone.

3. A tank according to claim 1, wherein the active means comprise a pump leading to the main volume (V1).

4. A tank according to claim 1, wherein the active means comprise an ejector.

5. A tank according to claim 1, wherein the feed duct is vertically above the active means.

6. A tank according to claim 1, wherein the tank includes an under-slope gauge system for gauging the fuel contained in the under-slope volume (V2), and a main gauge system for gauging the fuel contained in the main volume (V1).

7. A tank according to claim 1, wherein the tank includes at least two sloping walls each defining a respective under-slope volume (V2), the tank having communication means for communicating the under-slope volumes with each other.

8. A tank according to claim 1, wherein the tank includes at least one separation wall for splitting an under-slope volume (V2) into two volumes.

9. An aircraft, including a tank according to claim 1.

10. A method of storing fuel in a tank according to claim 1, the method comprising the following steps:
   filling the main volume with fuel, each under-slope volume being filled with fuel from the main volume by the transfer system; and
   drawing fuel from the main volume in order to consume it, and transferring fuel from the under-slope volume to the main volume via the transfer system.

11. A tank for storing fuel, the tank having a casing extending in elevation from a bottom towards a top wall, a side wall defining the casing between the bottom and the top wall, the casing defining an inside volume of the tank, the tank being provided with at least one sloping wall that extends between the side wall and the bottom in order to provide at least one slope capable of directing fuel towards a predetermined zone of the tank by gravity, the sloping wall subdividing the inside volume of the tank into a main volume (V1) and an under-slope volume (V2) both of which are capable of containing fuel, the predetermined zone being disposed within the main volume (V1), the under-slope volume (V2) being disposed below the main volume (V1) and being defined by the sloping wall together with the side wall and the bottom, the tank having a fuel transfer system for transferring fuel from the under-slope volume (V2) to the main volume (V1) and from the main volume (V1) to the under-slope volume (V2), the transfer system including at least one feed duct disposed in the sloping wall above the predetermined zone for transferring fuel by gravity from the main volume (V1) to the under-slope volume (V2), and the transfer system including at least one active means for transferring fuel from the under-slope volume (V2) to the main volume (V1).

12. The tank of claim 11, wherein the feed duct is disposed in a first plane, and the predetermined zone is disposed in a second plane, lower than the first plane.

13. The tank of claim 12, wherein the active means is disposed in a third plane, lower than the first plane, and the predetermined zone comprises a feed zone for fuel.

14. The tank of claim 12, wherein the tank is capable of transferring fuel from the inside volume of the tank to outside the tank via a pipework having an opening disposed in the predetermined zone.

15. The tank of claim 14, wherein the fuel is contained within the main volume (V1) and the under-slope volume (V2) of the tank, and the main volume (V1) is defined at least in part by the side wall.

16. A tank for storing fuel for an engine, the tank comprising:
   a casing defined by a bottom, a top wall, and a side wall extending in elevation between the bottom and the top wall, the casing defining an inside volume of the tank;
   at least one sloping wall extending at an angle between the side wall and the bottom to provide at least one slope capable of directing fuel towards a predetermined zone of the tank by gravity, the sloping wall subdividing the inside volume of the tank into a main volume (V1) and an under-slope volume (V2), with both of the main volume (V1) and the under-slope volume (V2) being capable of containing fuel, the under-slope volume (V2) being defined by the sloping wall together with the side wall and the bottom, the tank being capable of transferring fuel from the predetermined zone of the tank to an engine via pipework having an opening disposed in the predetermined zone; and
   a fuel transfer system for transferring fuel from the under-slope volume (V2) to the main volume (V1) and from the main volume (V1) to the under-slope volume (V2), the transfer system including at least one feed duct for transferring fuel by gravity from the main volume (V1) to the under-slope volume (V2), at least one active means for transferring fuel from the under-slope volume (V2) to the main volume (V1), and at least one vent means for venting the under-slope volume (V2), with the vent means passing through the sloping wall and leading to a space in the main volume (V1).

17. The tank of claim 16, wherein the feed duct is disposed in a first plane, and the predetermined zone is disposed in a second plane, lower than the first plane.

18. The tank of claim 16, wherein the active means is disposed in a third plane, lower than the first plane, and the fuel is contained within the main volume (V1) and the under-slope volume (V2) of the tank, and the main volume (V1) is defined at least in part by the side wall.

19. A tank according to claim 1, wherein the tank includes at least two sloping walls each defining a respective under-slope volume (V2), the tank having communication means for communicating the under-slope volumes with each other, and the predetermined zone being disposed between the sloping walls.

* * * * *